Patented Apr. 27, 1937

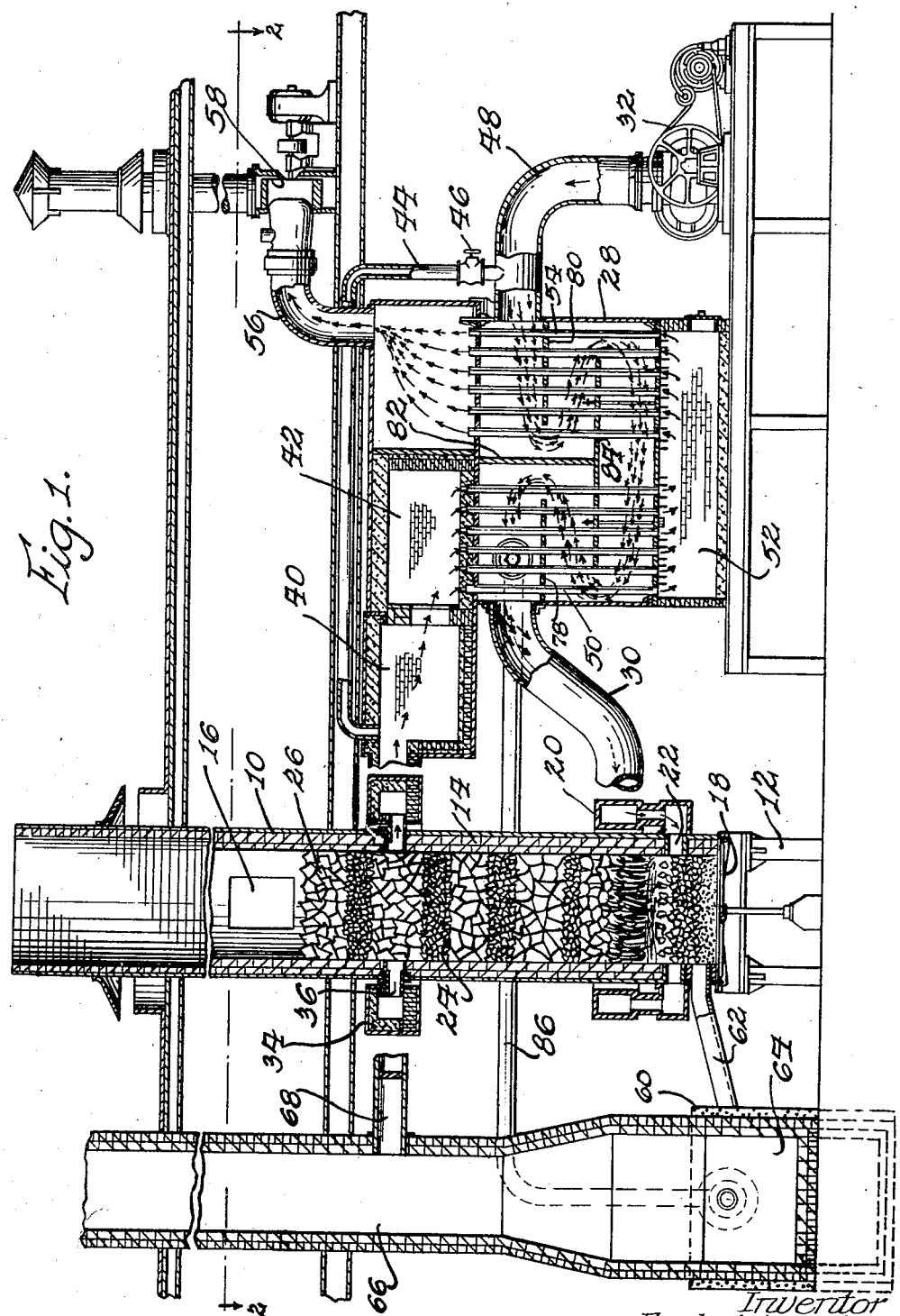

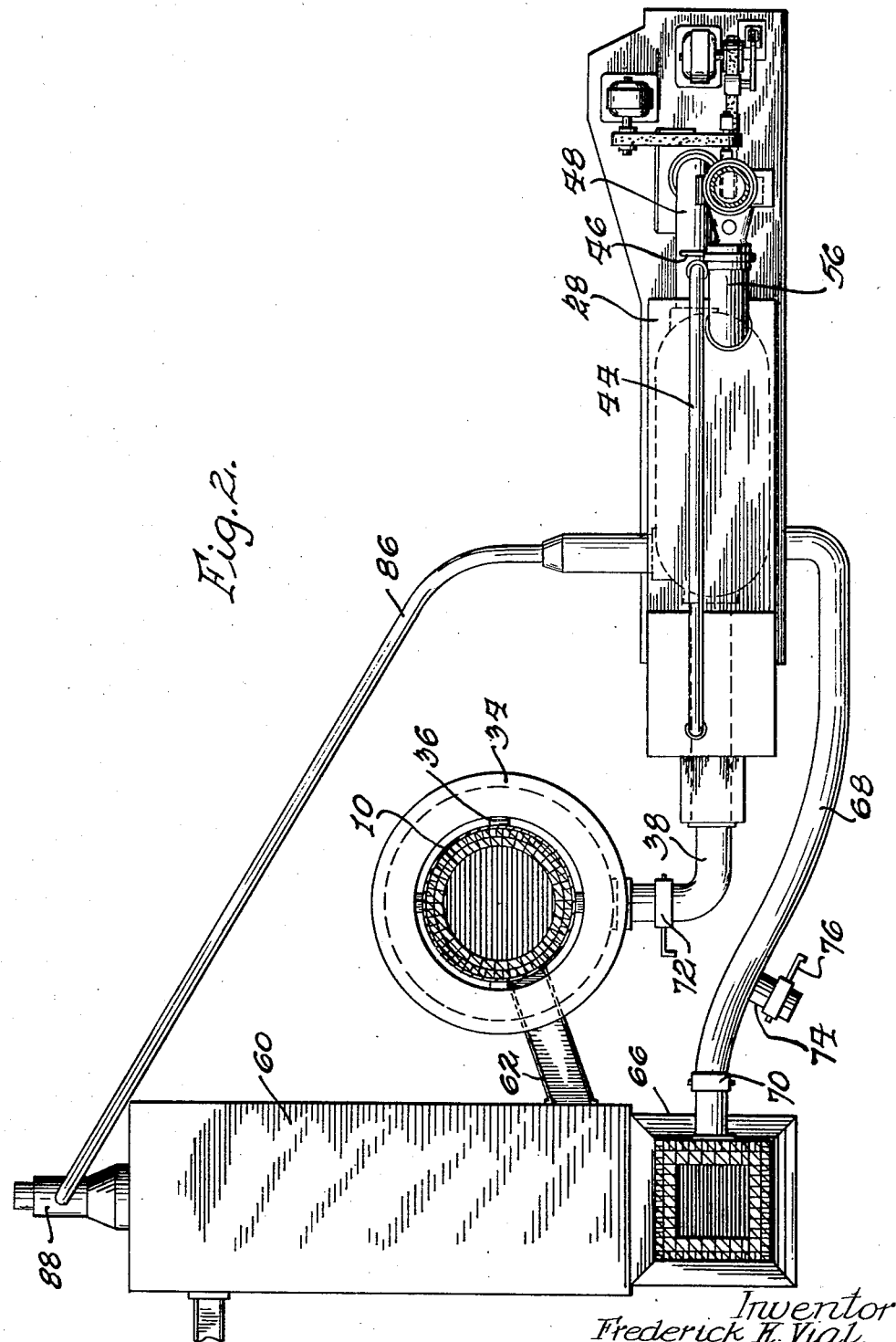

2,078,747

UNITED STATES PATENT OFFICE 2,078,747

PROCESS OF AND APPARATUS FOR OPERATING CUPOLAS

Frederick K. Vial, La Grange, Ill., assignor to Griffin Engineering Company, Chicago, Ill., a corporation of Illinois Application January 13, 1934, Serial No. 706,549

20 Claims. (Cl. 75—43)

The present invention relates to remelting metal working apparatuses and processes of operating the same, and more in particular to such apparatuses and processes for the economical production of liquid iron for use in producing gray and malleable iron, steel and the like, this application being a continuation in part of copending application Serial No. 592,861, filed February 15th, 1932.

Among the objects of the present invention is to provide novel apparatus and a novel method of operating the same, whereby liquid iron may be efficiently and economically produced by the use of a preheater, wherein the combustion supporting medium for a cupola producing this liquid iron is preheated by waste gases from a refining furnace which may be of a reverberatory or open hearth type, wherein suitable fuel, as for example powdered coal, oil or natural gas, is used.

Another object of the present invention is to provide a novel apparatus and novel method of operating the same, whereby liquid iron is efficiently produced in a cupola by the use of a preheater adapted to raise the temperature of the combustion supporting medium therefor by utilization of the waste heat either from a refining furnace or from the cupola alone, or by utilization of the waste heat from both the furnace and cupola.

The present invention contemplates the idea of providing for an accurate and variable control of the waste gases from both the cupola and refining furnace by means of which heat can be recovered and transferred to the combustion supporting medium passing through a preheater without overheating or damaging this preheater.

The present invention also contemplates novel apparatus and a method of operating the same, whereby the waste gases from a cupola, and a furnace used in conjunction therewith, may be utilized for preheating the combustion supporting medium used to support combustion in the cupola and the refining furnace.

Another object within the purview of the present invention is to provide a novel apparatus and method of operating the same for producing liquid iron, wherein the combustible gases of the gaseous products of combustion in a cupola are burned and the gases from the cupola are mixed with waste gases from a refining furnace for use in preheating the combustion supporting medium used in the cupola and/or furnace. The present invention also has as an object the idea of providing suitable remelting metal working apparatus and a method of operating the same whereby the burning of the gases from the cupola may be regulated and the temperature and quantity of the waste gases from the refining furnace controlled to regulate the temperature of these gases when mixed in order not to overheat or damage a preheater used in conjunction with the cupola and furnace, and also to regulate the temperature of the combustion supporting medium used to support combustion in the cupola and/or furnace which utilizes waste heat units from these gases.

The invention also contemplates the provision of an improved process and apparatus for the production of liquid iron in a hot blast cupola in which the waste gases drawn from the cupola as they enter the preheater are under control to prevent overheating of the metal plates or tubes of the preheater.

Still another object of the present invention is to provide for the use of waste gases of high temperature, produced independently of the cupola, such as waste gases from blast furnaces, coke ovens, natural gas and the like, in which the temperature of the gases is controlled in the preheater by mixing with atmospheric air, either independently or in combination with waste gases of combustion from the cupola, to prevent overheating of the metal through which the heat is transferred to preheat the blast and to regulate the temperature thereof.

The invention also contemplates the use of separately provided gas of high temperature, such as independently fired combustion furnaces by natural gas, oil, powdered coke or the like, the temperature of these gases being controlled as may be necessary to suit the preheating element.

Other objects, features, capabilities, advantages and method steps are comprehended by the invention, as will later appear and as are inherently possessed thereby.

Referring to the drawings:

Figure 1 is a view in elevation of an apparatus made in accordance with the present invention and adapted to be used in following the method disclosed herein, parts being broken away to disclose the same in vertical cross-section; and Figure 2 is a view of the device shown in Figure 1 of the drawings, taken through the plane defined by line 2—2 of Figure 1.

Referring now more in detail to the drawings, an apparatus selected to disclose the present invention is shown as comprising a remelting iron cupola 10 of usual construction, supported upon a base 12 and comprising essentially a refractory tubular body 14 having a charging door 16 near its top, this tubular body being closed at its bottom with dump doors 18. A wind box 20 is arranged about the bottom of the cupola and communicates with tuyères 22 disposed in spaced relation circumferentially around the body and opening into the lower or combustion zone of the cupola. The cupola is charged with alternate layers of coke 24 and iron 26 through the charging door 16 to provide a substantial column of material within the body. The air to support combustion is passed through a preheater, generally designated as 28, and out from this preheater through a conduit 30 to the wind box 20, a blower 32 forcing the air through a pipe 48 which leads from the blower 32 to the preheater 28, the blower 32 providing the desired volume and pressure of the blast to the cupola.

The cupola is also provided with a bustle pipe 34 arranged about the body of the cupola and well up toward the charging door. This bustle pipe has communication through a plurality of openings 36 with the interior of the cupola and in turn is connected to a conduit 38 which communicates with the interior of a combustion chamber 40 of the preheater 28 in which the gases withdrawn from the cupola through the openings 36 and bustle pipe 34 may be burned, as will be hereinafter more fully described, for delivery to the preheater. These gases, after being burned, pass to the preheater 28 through a heat distributing chamber 42.

A conduit 44 controlled by a valve 46 extends from pipe 48 to the combustion chamber 40 to support combustion of the combustible gases withdrawn from the cupola through the openings 36 and bustle pipe 34.

As disclosed in Figure 1 of the drawings, the preheater includes the combustion chamber 40 in which the unburned gases from the cupola are burned and then pass into the distributing chamber 42. The burned gases are then adapted to pass from this distributing chamber 42 downwardly through pipes or flues 50 at one side of the preheater across its bottom 52 and up through pipes or flues 54 to a stack outlet 56 and then through a suction or exhaust fan 58.

In the apparatus disclosed is included a refining furnace 60 which is adapted to receive molten iron from the cupola which flows from the bottom part thereof over a trough or conduit 62 into this furnace for the production of gray or malleable iron or steel. This furnace is fired by any suitable fuel, as for example, powdered coal, oil or natural gas, which may be burned in a combustion chamber 64 and the products of combustion pass over the heated iron received from the cupola. The burned gases from the furnace are highly heated and pass up a stack 66 and may be drawn into a pipe or conduit 68 and thence through this pipe or conduit and delivered to the distributing chamber 42 of the preheater.

A control valve 70 is provided in the conduit 68 adjacent the stack 66 and a valve 72 is provided in the pipe or conduit 38 which leads from the bustle pipe 34 to the combustion chamber 40. An air inlet pipe 74 is connected to the conduit 68 for the introduction of air into the same, the amount of air introduced being controlled by means of the valve 76.

In accordance with the present process, the heating medium in the preheater which is drawn through the combustion chambers 40 and 42 and which passes through the pipes or flues 50 and 54 is subject to accurate temperature control. This medium may consist of cupola gases withdrawn through the openings 36 and bustle pipe 34 and burned in the combustion chamber 40, and the temperature therein may be controlled as desired by introducing air at atmospheric temperature into the pipe 68 through the valve 76 when the valve 70 is closed, or it may consist of furnace flue gases withdrawn directly from the stack 66 through the conduit 68 and conducted to the distributing chamber 42, it being understood, of course, that the valve 72 may be open or closed at this time. It is of course understood that the temperature of this flue gas may likewise be controlled by the admission of air at atmospheric temperature through the valve 76.

When desired, gases from both the furnace flue stack 66 and cupola 10 may be introduced into the preheater together, and the combustion of the cupola gas accomplished in the combustion chamber. It will be understood that the waste gases from the furnace are non-combustible, and conduit 68 through which these gases are introduced into the preheater likewise has the valve 76 controlling the temperature of the combined gases passing through the preheater. Inasmuch as the flue gas will not support combustion, and in view of the fact that it may be desired to lower the temperature of gases from the preheater, this conduit 68 is led into the distributing chamber 42. The gaseous products of combustion from the cupola are burned in the combustion chamber 40 with the aid of air passing through the pipe 44. These gases when burned, of course have the temperature raised, and the same then pass into the distributing chamber 42 and are mixed with the waste gases from the furnace. This mixture of gases from the cupola and furnace then passes through the flues or conduits 50 and 54 of the preheater. The air which is introduced into the preheater for supporting combustion in either or both the cupola and furnace is directed about the pipes or flues 50 and 54 by baffles 78, 80, 82 and 84, so that it has full opportunity to absorb the sensible heat of the medium passing through the pipes or flues 50 and 54.

The furnace 60 provides a convenient outside source of highly heated medium which may be passed through the preheater, and the sensible heat transferred to the air supplied the cupola, thereby utilizing a great number of heat units passing up through the stack 66 which would otherwise be lost or wasted. This invention also contemplates such other source of such medium as may be suitable or desired in each particular instance. Where, however, the furnace 60 or other source of hot waste gases is available, utilization of such gases as a medium for preheating the air to the cupola effects substantial economy in fuel.

It is also understood that if desired, a pipe or conduit, such as 86, may be provided to convey heated air from the preheater to the air inlet 88 of the furnace.

While I have herein described and upon the drawings shown an illustrative embodiment of the invention, it is to be understood that the invention is not limited thereto but may comprehend other constructions, arrangements of parts, details, features and method steps without departing from the spirit of the invention.

I claim:

1. The process of operating a remelting metal working apparatus, comprising the steps of charging a remelting cupola furnace with quantities of metal and combustible material, delivering air to support combustion of said material through a preheater, discharging molten metal from said cupola directly to a refining furnace, introducing waste non-combustible gases from another furnace into said preheater to transfer heat therefrom to said air without being mixed therewith to preheat the same prior to its entrance into said cupola, and introducing preheated air from said preheater into said refining furnace to support combustion therein.

2. The process of operating a remelting metal working apparatus, comprising the steps of charging a remelting cupola furnace with quantities of metal and combustible material, delivering air to support combustion of said material through a preheater, withdrawing the gaseous products from said cupola, and conducting said gaseous products together with waste gases from another furnace into said preheater to transfer heat therefrom to said air to preheat the same prior to its entrance into said cupola.

3. The process of operating a remelting metal working apparatus, comprising the steps of charging a remelting cupola with quantities of metal and combustible material, delivering air to support combustion of said material through a preheater, withdrawing the unburned gases resulting from combustion within said cupola, burning said gases, and conducting said burned gases together with waste gases from a furnace into said preheater to transfer heat therefrom to said air to preheat the same prior to its entrance into said cupola.

4. The process of operating a remelting metal working apparatus, comprising the steps of charging a remelting cupola with quantities of metal and combustible material, delivering air to support combustion of said material through a preheater, withdrawing combustible and non-combustible gases resulting from combustion within said cupola, introducing air to said gases to burn said combustible gas, and conducting said gases together with waste gases from a furnace into said preheater to transfer heat therefrom to said air to preheat the same prior to its entrance into said cupola.

5. The process of operating a remelting metal working apparatus, comprising the steps of charging a remelting cupola with quantities of metal and combustible material, delivering air to support combustion of said material through a preheater, withdrawing combustible and non-combustible gases resulting from combustion within said cupola, introducing air to said gases to burn said combustible gas, conducting said gases together with waste gases from a furnace into said preheater to transfer heat therefrom to said air to preheat the same prior to its entrance into said cupola, and introducing preheated air from said preheater into furnace to support combustion therein.

6. The process of operating a remelting metal working apparatus, comprising the steps of charging a remelting cupola with quantities of metal and combustible material, delivering air to support combustion of said material through a preheater, withdrawing combustible and non-combustible gases resulting from combustion within said cupola, introducing air to said gases to burn said combustible gas, discharging molten metal from said cupola to a refining furnace, conducting the burned gases together with waste gases from said furnace into said preheater to transfer heat therefrom to said air to preheat the same prior to its entrance into said cupola, and introducing preheated air from said preheater into said furnace to support combustion therein.

7. In an iron working apparatus, the combination of a remelting cupola, a refining furnace to which said cupola delivers molten metal, a preheater provided with a burner, means for conducting gases from said cupola to said burner, means for delivering a combustion supporting medium into said burner for burning the combustible gases from said cupola entering said burner, means for conducting gases from said furnace to said preheater and for mixing the same with the gases from the cupola passing through said burner, means for regulating the proportions of said cupola and furnace gases and the temperature of the resulting mixture thereof, and means for conducting atmospheric air heated in said preheater by said gases to the zone of combustion of said cupola and separately to the zone of combustion in said refining furnace.

8. In a remelting metal working apparatus, the combination of a remelting cupola, a preheater, means for conducting an air blast through said preheater to said cupola, a furnace, means for conducting waste gases from said furnace to said preheater whereby said air blast to said cupola is heated above atmospheric temperature, and means for directing air from said air blast to said furnace to support combustion therein.

9. In a remelting metal working apparatus, the combination of a remelting cupola, a preheater, a refining furnace, means for discharging molten metal from said cupola into said furnace, means for conducting an air blast through said preheater to said cupola, and means for conducting waste gases from said furnace to said preheater whereby said air blast to said cupola is heated above atmospheric temperature.

10. In a remelting metal working apparatus, the combination of a remelting cupola, a preheater, a refining furnace, means for discharging molten metal from said cupola into said furnace, means for conducting an air blast through said preheater to said cupola, means for conducting waste gases from said furnace to said preheater whereby said air blast to said cupola is heated above atmospheric temperature, and means for directing air from said air blast to said furnace to support combustion therein.

11. In a remelting metal working apparatus, the combination of a remelting cupola, a preheater, means for conducting an air blast through said preheater to said cupola, a furnace, means for withdrawing unburned gases from said cupola, and means for conducting gases from said cupola together with waste gases from said furnace to the preheater whereby said air blast to said cupola is heated above atmospheric temperature.

12. In a remelting metal working apparatus, the combination of a remelting cupola, a preheater, means for conducting an air blast through said preheater to said cupola, a furnace, means for withdrawing unburned gases from said cupola, means for conducting gases from said cupola together with waste gases from said furnace to the preheater whereby said air blast to said cupola is heated above atmospheric temperature, and means for directing air from said air blast to said furnace to support combustion therein.

13. In a remelting metal working apparatus, the combination of a remelting cupola, a preheater, means for conducting an air blast through said preheater to said cupola, a refining furnace for receiving molten metal from said cupola, means for withdrawing unburned gases from said cupola, and means for conducting gases from said cupola together with waste gases from said furnace to the preheater whereby said air blast to said cupola is heated above atmospheric temperature.

14. In a remelting metal working apparatus, the combination of a remelting cupola, a preheater, means for conducting an air blast through said preheater to said cupola, a refining furnace for receiving molten metal from said cupola, means for withdrawing unburned gases from said cupola, means for conducting gases from said cupola together with waste gases from said furnace to the preheater whereby said air blast to said cupola is heated above atmospheric temperature, and means for directing air from said air blast to said furnace to support combustion therein.

15. In a remelting metal working apparatus, the combination of a remelting cupola, a preheater, means for conducting an air blast through said preheater to said cupola, a refining furnace for receiving molten metal from said cupola, means for withdrawing unburned gases from said cupola and conducting the same to said preheater, means for conducting waste gases from said furnace to said preheater, and means for regulating the flow of gases from said furnace and cupola to said preheater whereby gas may be conducted either from said cupola or from said furnace alone to said preheater or from both said cupola and furnace to said preheater.

16. In a remelting metal working apparatus, the combination of a remelting cupola, a preheater, means for conducting an air blast through said preheater to said cupola, a refining furnace for receiving molten metal from said cupola, means for withdrawing unburned gases from said cupola and conducting the same to said preheater, means for conducting waste gases from said furnace to said preheater, and means for regulating the flow of gases from said furnace and cupola to said preheater whereby gas may be conducted either from said cupola or from said furnace alone to said preheater or from both said cupola and furnace to said preheater, and means for directing air from said air blast to said furnace to support combustion therein.

17. The process of operating a remelting metal working apparatus, comprising the steps of charging a remelting cupola with quantities of metal and combustible material, delivering air to support combustion of said material through a preheater, withdrawing the gases resulting from combustion within said cupola, and utilizing the heat units of said gases together with the heat units of waste gases from a furnace to raise the temperature of said air prior to its entrance into said cupola.

18. The process of operating a remelting metal working apparatus, comprising the steps of charging a remelting cupola with quantities of metal and combustible material, delivering air to support combustion of said material through a preheater, withdrawing the gases resulting from combustion within said cupola, utilizing the heat units of said gases together with the heat units of waste gases from a furnace to raise the temperature of said air prior to its entrance into said cupola, and introducing preheated air from said preheater into said furnace to support combustion therein.

19. The process of operating a remelting metal working apparatus, comprising the steps of charging a remelting cupola with quantities of metal and combustible material, delivering air to support combustion of said material through a preheater, withdrawing combustible and non-combustible gases resulting from combustion within said cupola, and conducting said gases together with waste gases from a furnace into said preheater to transfer heat therefrom to said air to preheat the same prior to its entrance into said cupola.

20. The process of operating a remelting metal working apparatus, comprising the steps of charging a remelting cupola with quantities of metal and combustible material, delivering air to support combustion of said material through preheating means, withdrawing the gases resulting from combustion within said cupola, utilizing the heat units of said gases together with the heat units of waste gases from a furnace to raise the temperature of said air prior to its entrance into said cupola, and introducing preheated air from the preheating means into said furnace to support combustion therein.

FREDERICK K. VIAL.